United States Patent
Gehman et al.

(10) Patent No.: US 6,304,553 B1
(45) Date of Patent: Oct. 16, 2001

(54) METHOD AND APPARATUS FOR PROCESSING DATA PACKETS

(75) Inventors: Judy M. Gehman; Fataneh F. Ghodrat; David A. Thomas, all of Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/156,432

(22) Filed: Sep. 18, 1998

(51) Int. Cl.⁷ ................................................. H04L 12/54
(52) U.S. Cl. ........................ 370/235; 370/393; 370/428
(58) Field of Search ............................ 370/252, 389, 370/392, 393, 230, 231, 235, 412, 428, 429, 474; 710/52, 53

(56) References Cited

U.S. PATENT DOCUMENTS

| | | | |
|---|---|---|---|
| 4,914,652 | 4/1990 | Nguyen | 370/85.5 |
| 5,016,221 | 5/1991 | Hamstra | 365/221 |
| 5,058,110 * | 10/1991 | Beach et al. | 370/389 |
| 5,210,749 | 5/1993 | Firoozmand | 370/85.1 |
| 5,247,626 | 9/1993 | Firoozmand | 395/250 |
| 5,276,684 | 1/1994 | Pearson | 370/94.1 |
| 5,351,243 * | 9/1994 | Kalkunte et al. | 370/389 |
| 5,436,892 | 7/1995 | Tago et al. | 370/60 |
| 5,448,558 | 9/1995 | Gildea et al. | 370/60 |
| 5,588,000 | 12/1996 | Rickard | 370/428 |
| 5,602,841 | 2/1997 | Lebizay et al. | 370/413 |
| 5,663,961 | 9/1997 | McRoberts et al. | 370/412 |
| 5,678,060 | 10/1997 | Yokoyama et al. | 395/831 |
| 5,708,779 | 1/1998 | Graziano et al. | 395/200.8 |
| 5,805,808 * | 9/1998 | Hasani et al. | 395/200.2 |

* cited by examiner

*Primary Examiner*—Ricky Ngo

(57) ABSTRACT

A method and apparatus for receiving packets from a bus. A packet is received at an interface to the bus. The packet is parsed, and a determination is made whether to retain the packet from the parsing of the packet. The packet is placed in a buffer with a header. The packet is moved from the buffer to another bus using information located within the header, wherein repeated parsing of the packet to move the packet to another bus is unnecessary.

43 Claims, 5 Drawing Sheets

METHOD AND APPARATUS FOR PROCESSING DATA PACKETS

BACKGROUND OF THE INVENTION

1. Technical Field

The present invention relates generally to an improved data processing system, and in particular to a method and apparatus for receiving data packets. Still more particularly, the present invention provides a method and apparatus for parsing data packets.

2. Description of the Related Art

Transmission of packets between data processing systems involves a number of steps. Data within a data processing system is collected through a feature, such as direct memory access (DMA). The data is assembled into a single packet and sent across a communications link to a target data processing system. The packet includes a header and a payload. The header includes information identifying the target, payload type, source, and various control data as specified by the protocol while the payload holds the data that is transmitted. When a packet is received at a data processing system, the packet is parsed to see if the packet is intended for the data processing system.

IEEE 1394 is an international serial bus standard. This standard provides a low cost digital interface that can be used for multimedia applications. Data may be transported at 100, 200 or 400 megabits per second as per the IEEE 1394–1995 Annex J Phys-Link Interface Specification. A 1394 serial bus supports two types of data transfer: asynchronous and isochronous. Asynchronous data transfer emphasizes delivery of data at the expense of no guaranteed bandwidth to deliver the data. Data packets are sent and an acknowledgment is returned. If a data defect is present, the packet can be resent. In contrast, isochronous data transfer guarantees the data transmission bandwidth through channel allocation, but cannot resend defective data packets. This type of transfer is especially useful with multimedia data.

Currently, on a data processing system using the 1394 standard, a link, providing the interface to the 1394 serial bus, must parse a received packet to determine whether to accept the packet and whether to acknowledge acceptance of a packet. If the packet is accepted, the link places the packet into a buffer configured as a first-in-first-out (FIFO) buffer. On the other side of the FIFO buffer in the data processing system is a DMA engine that removes the packet and parses the packet in a manner similar to the link.

This mechanism results in redundant functions and circuitry. Therefore, it would be advantageous to have an improved method and apparatus for receiving packets on a data processing system.

SUMMARY OF THE INVENTION

The present invention provides a method and apparatus for receiving packets from a bus. A packet is received at an interface to the bus. The packet is parsed, and a determination is made whether to retain the packet from the parsing of the packet. The packet is placed in a buffer with a header. The packet is moved from the buffer to another bus using information located within the header, wherein repeated parsing of the packet to move the packet to another bus is unnecessary.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
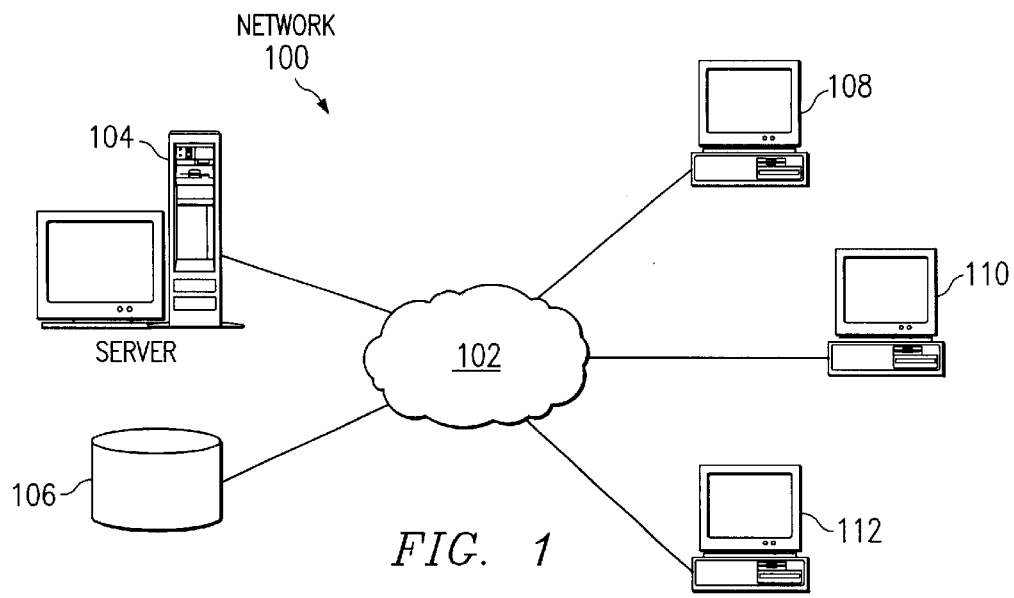
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections. In the depicted examples, the medium includes a serial bus configured according to IEEE 1394.

In the depicted example, a server 104 is connected to network 102 along with storage unit 106. In addition, clients 108, 110, and 112 also are connected to a network 102. These clients 108, 110, and 112 maybe, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown.

Figure 2:
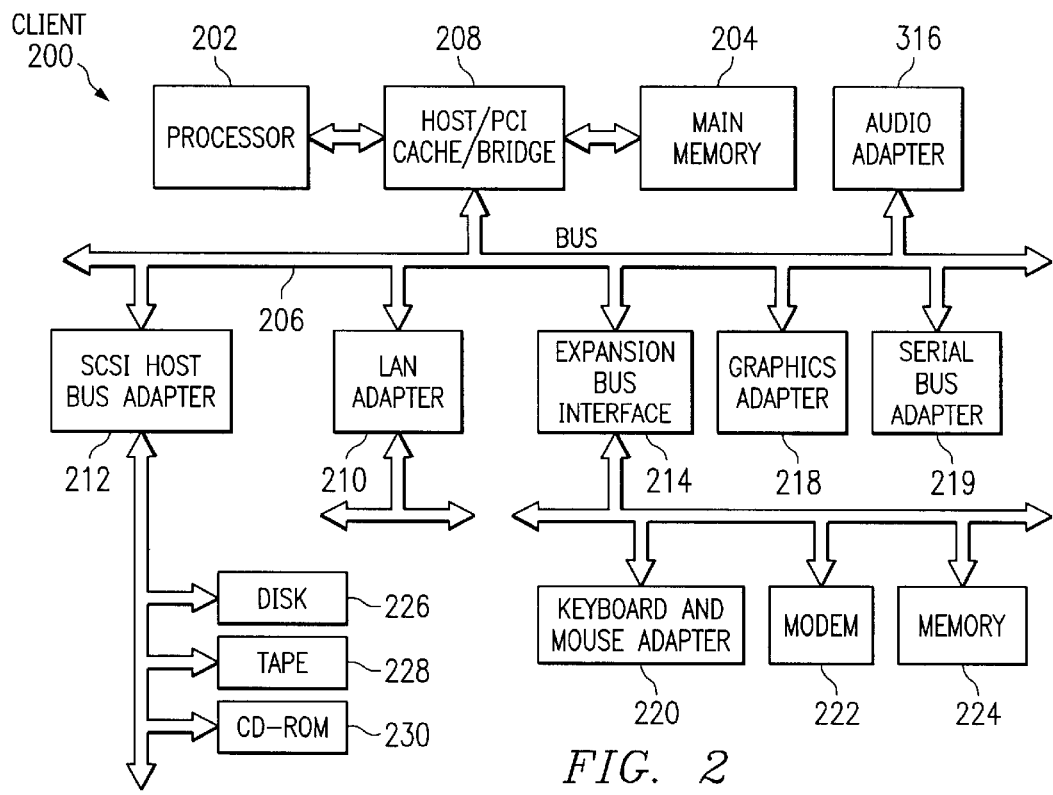
FIG. 2 is a block diagram of a data processing system in which the present invention may be implemented.

With reference now to FIG. 2, a block diagram of a data processing system in which the present invention may be implemented is illustrated. Data processing system 200 is an example of a client computer. Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and serial bus adapter 219 are connected to PCI local bus 206 by add-in boards inserted into expansion slots. In the depicted example, serial bus adapter 219 is a 1394 serial bus employing IEEE 1394 standard. Serial bus adapter 219 provides a connection between PCI local bus 206 and a 1394 serial bus (not shown). The apparatus and processes of the present invention may be implemented within serial bus adapter 219. The LAN may be implemented as a serial bus architecture in the depicted example. In such a case, the processes of the present invention may be implemented in LAN adapter 210.

Expansion bus interface 214 provides a connection for a keyboard and mouse adapter 220, modem 222, and additional memory 224. SCSI host bus adapter 212 provides a connection for hard disk drive 226, tape drive 228, and CD-ROM 230 in the depicted example. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as NT Windows or OS/2. Windows NT is available from Microsoft Corporation, and OS/2 is available from International Business Machines Corporation. "OS/2" is a trademark of from International Business Machines Corporation. Instructions for the operating system and applications or programs are located on storage devices, such as hard disk drive 226 and may be loaded into main memory 204 for execution by processor 202.

Those of ordinary skill in the art will appreciate that the hardware in FIG. 2 may vary depending on the implementation. For example, other peripheral devices, such as optical disk drives and the like may be used in addition to or in place of the hardware depicted in FIG. 2. The depicted example is not meant to imply architectural limitations with respect to the present invention. For example, the processes of the present invention may be applied to multiprocessor data processing system.

Figure 3:
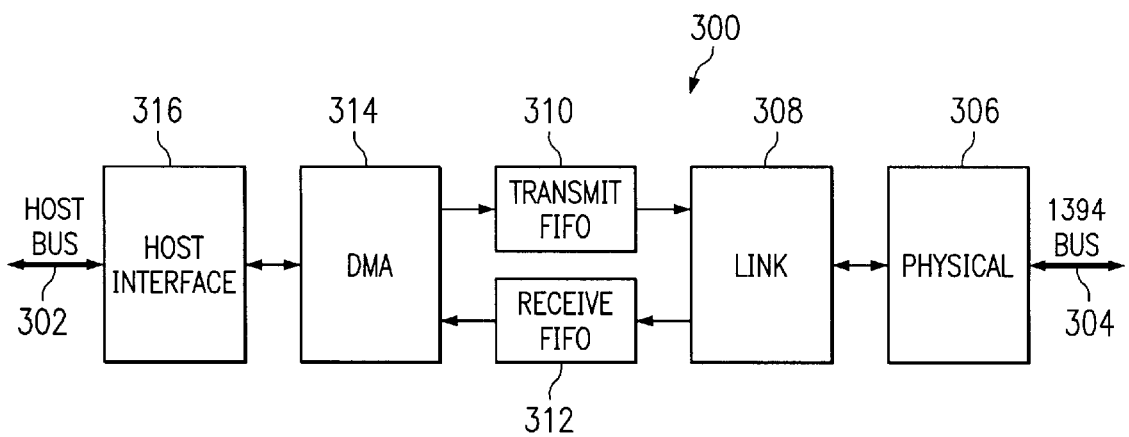
FIG. 3 is a diagram of a serial bus adapter in accordance with a preferred embodiment of the present invention.

Turning now to FIG. 3, a diagram of a serial bus adapter is depicted in accordance with a preferred embodiment of the present invention. Serial bus adapter 300, also referred to as a "node", includes a number of components used to provide an interface between PCI local bus 302 and a 1394 serial bus 304. Serial bus adapter in the depicted example may be serial bus adapter 219 from FIG. 2. Serial bus adapter 300 includes a physical layer device 306, a link 308, a transmit FIFO unit 310, a receive FIFO unit 312, a DMA engine 314, and a host interface 316. Physical layer device 306 transmits and receives a serial string of data Physical layer device 306 includes a layer that translates the logical symbols used by the link layer into electrical signals on the different serial bus media in the depicted example. Physical layer device 306 guarantees that only one node at a time is sending data (i.e., arbitration) and defines the mechanical interfaces for the serial bus. Physical layer device 306 also propagates tree topology information and provides data synchronization. Link 308 communicates data and control information between physical layer and transaction or application layers regarding asynchronous and isochronous packets and physical device configuration. This also includes data transfer, confirmation, addressing and data checking. In transferring data, a number of layers are present in the following order from the highest level from the lowest level: an application layer, a transaction layer, a link layer, and a physical layer. This also includes data transfer, confirmation, addressing and data checking. The link layer defines how information is to be transported on the physical layer from the transaction layer. The physical layer defines the behavior at the physical bus. The transaction layer defines operation between nodes, and the application layer defines the interface between the user and the transaction layer.

Physical layer 306 and link 308 convert the serial string of data to and from packets of quadlets. A "quadlet" is 4 bytes or 32 bits. When data is received from 1394 serial bus 304, physical layer device 306 converts the packet from a string of serial data to a parallel string of data that may be, for example, 2, 4, or 8 bits wide as in the Annex of IEEE 1394-1395. Link 308 parses the packet and decides whether the packet is addressed to serial bus adapter 300. If the packet is to be accepted, link 308 also decides whether to acknowledge receipt of the packet. Additionally, how the packet is to be acknowledged is handled by link 308. When link 308 accepts a packet, the packet is placed into receive FIFO unit 312. DMA engine 314 removed the packet from receive FIFO unit 312 and moves the packet to the host on PCI local bus 302 using host interface 316.

Figure 4A:
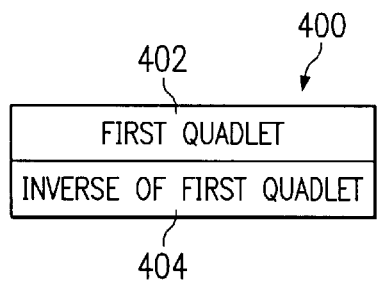
FIGS. 4A–4D are diagrams of packets handled by serial bus adapter in accordance with a preferred embodiment of the present invention.
Figure 4B:
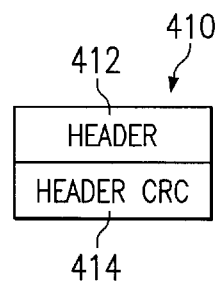
Figure 4C:
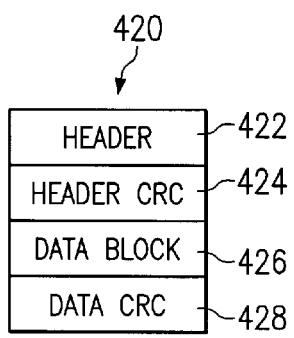

Referring now to FIGS. 4A–4D, diagrams of packets handled by serial bus adapter 300 in FIG. 3 are depicted in accordance with a preferred embodiment of the present invention. Physical device packet 400 in FIG. 4A has two quadlets. In particular, physical device packet 400 includes a quadlet 402 and an inverse quadlet 404. Inverse quadlet 404 is the inverse of quadlet 402 in physical device packet 400. Physical device packet 400 is generated by physical device 306, as specified by IEEE 1394-1395. Some 1394 packets do not have a data block section while others do. In FIG. 4B, a 1394 packet 410 is illustrated. 1394 packet 410 is a packet without a data block. 1394 packet 410 includes a header 412 made up of one or four quadlets and a header CRC 414 made up of one quadlet. Next in FIG. 4C, a 1394 packet 420 is illustrated. 1394 packet 420 includes a header 422, a header CRC424, a data block 426, and a data CRC 428. 1394 packet 420 includes a header 422 made up of one or four quadlets and a header CRC 424 made up of one quadlet Data block 426 may include one to N quadlets, and data CRC 428 is made up of one quadlet in the depicted example.

Figure 4D:
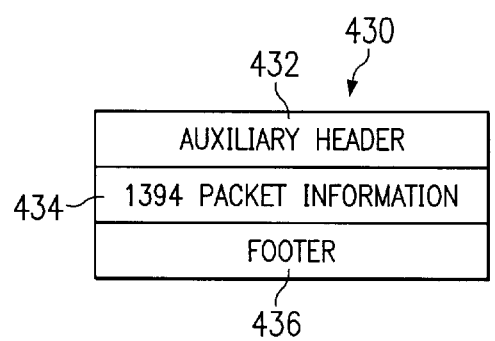

In FIG. 4D, a packet 430 is depicted. Packet 430 includes an auxiliary header 432, 1394 packet information 434, and a footer 436. 1394 packet information is includes any of 1394 packets 400, 410 or 420. 1394 packet 400 is a physical device packet, 1394 packet 410 is an isochronous packet, and 1394 packet 420 is an asynchronous packet in the depicted example. Footer 436 carries information about the speed that the packet was received and the acknowledgment sent back to the source of the packet. Packet 430 is generated by link 308 and placed into receive FIFO unit 312 for use by DMA engine 314. In accordance with a preferred embodiment of the present invention, auxiliary header 432 provides information needed by the DMA engine to process the packet in the FIFO without having to decode or parse the header. Auxiliary header 432 is generated and placed into the received FIFO unit 312 by link 308.

Figure 5:
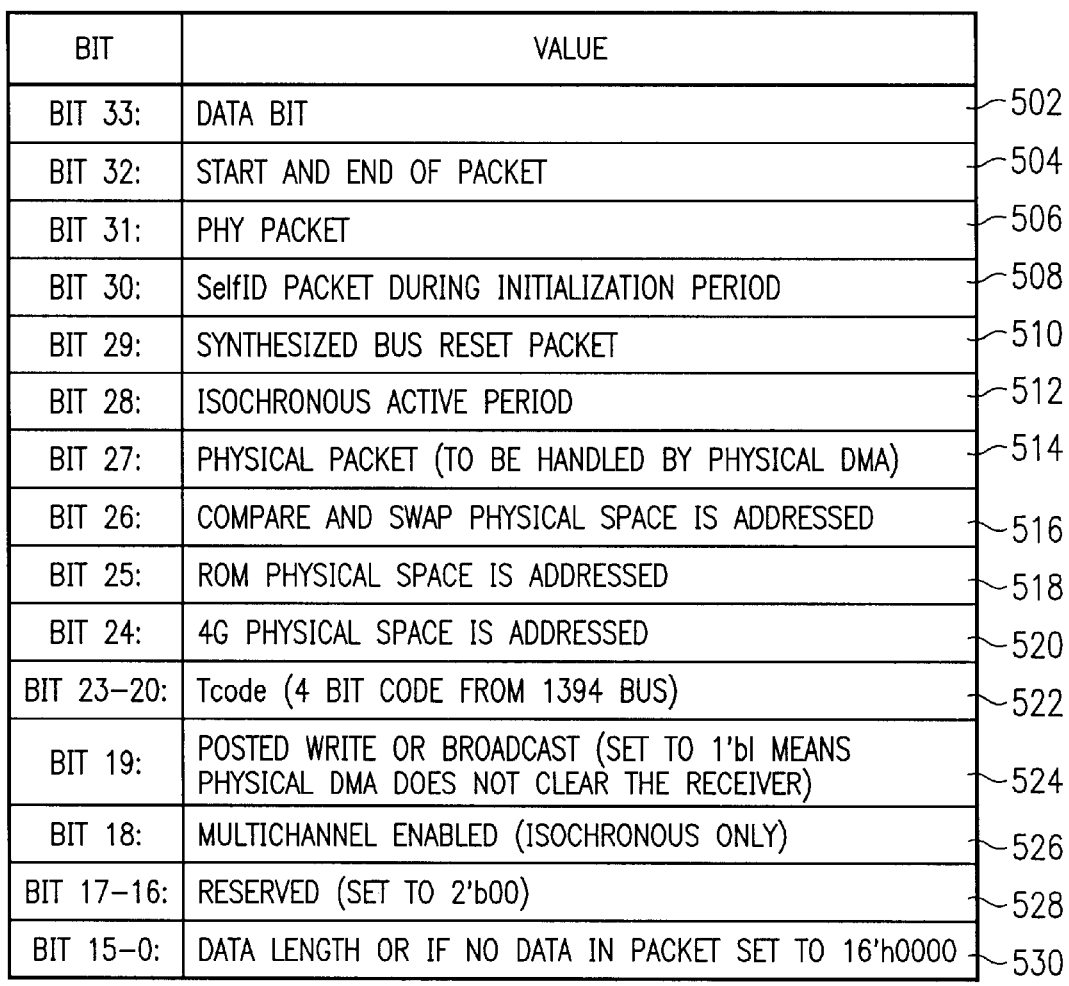
FIG. 5 is a diagram of an auxiliary header in accordance with a preferred embodiment of the present invention.

Turning now to FIG. 5, a diagram of an auxiliary header is illustrated in accordance with a preferred embodiment of the present invention. Auxiliary header 500 is a more detailed depiction of auxiliary header 432 from FIG. 4D. In the depicted example, auxiliary header 500 is one quadlet in receive FIFO unit 312. Depending on the implementation other sizes may be employed for auxiliary header 500. Auxiliary header 500 is used to provide the DMA engine with information about the packet such that the DMA engine does not have to decode the packet to process the packet.

In the depicted example, bit 33 in field 502 is a data bit used to indicate whether the quadlet is a data quadlet, while bit 32 in field 504 is used to indicate the start and end of the packet. Bit 31 in field 506 indicates a physical device packet. Bit 30 in field 508 is used to indicate a presence of a selfID packet during initialization. Bit 29 in field 510 indicates a synchronized bus reset packet. Bit 28 in field 512 indicates and isochronous active period. Bit 27 in field 514 indicates a presence of a physical packet that is to be handled by physical DMA. Next, bit 26 in field 516 indicates that compare and swap physical space is addressed by the packet, while bit 25 in field 518 indicates that ROM physical space is addressed. Bit 24 in field 520 indicates that 4G physical space is addressed. 4G physical space is defined for the depicted example as the lowest 4 gigabytes of 1394 address space. This space is used for nonprogrammable DMA processing in, for example, an Open Host Controller Interface (OHCI). Bit 23–20 in field 522 contains the Tcode, which is a four bit code from the 1394 serial bus. Transaction code (Tcode) is defined by IEEE 1394–1395 to designate primary packet types, such as, for example, isochronous, block read request, and lock request. Next, bit 19 in field 524 is used to indicate a PostedWrite or Broadcast (set to 1'b1 means physical DMA does not clear the receiver). Bit 18 in field 526 indicates whether multichannel is enabled, which is used for isochronous data transfer. Bits 17 and 16 in field 528 are reserved in the depicted example (set to 2'b00). Bits 15–0 in field 530 are used to indicate the data length in the 1394 packet If no data is present in the packet, these bits are set to 16'h0000. Of course, depending on the implementation, other information may be added or deleted from the auxiliary header 500 and more than one quadlet may be used.

When a 1394 packet is received by link 308, it can take several clock cycles to parse a physical device packet or the header section of a 1394 packet because the packets can contain one or four quadlets. Link 308 places the quadlets into receive FIFO unit 312 as link 308 receives the quadlets from physical device 306. Thus, quadlets are placed into receive FIFO unit 312 before a decision is made on whether to accept the packet. If link 308 decides to reject the packet, the quadlets must be removed from receive FIFO unit 312. The removal is accomplished by storing or remembering the FIFO write pointer location before writing the 1394 header. If the 1394 header is removed from receive FIFO unit 312, the write pointer is moved back to the position stored for the write FIFO pointer. The information to be placed in auxiliary header is determined after evaluating the entire header of the 1394 packet. As a result, a place is saved in receive FIFO unit 312 for the auxiliary header before the 1394 header is placed into receive FIFO unit 312. After placement of the 1394 header to receive FIFO unit 312, the auxiliary header before the 1394 header is placed into receive FIFO unit 312, the auxiliary header is place in its location. Thereafter, the rest of the packet and the footer quadlet is placed into receive FIFO unit 312 after the auxiliary header is written. Physically, the rest of the packet and footer are located after the 1394 header.

Figure 6:
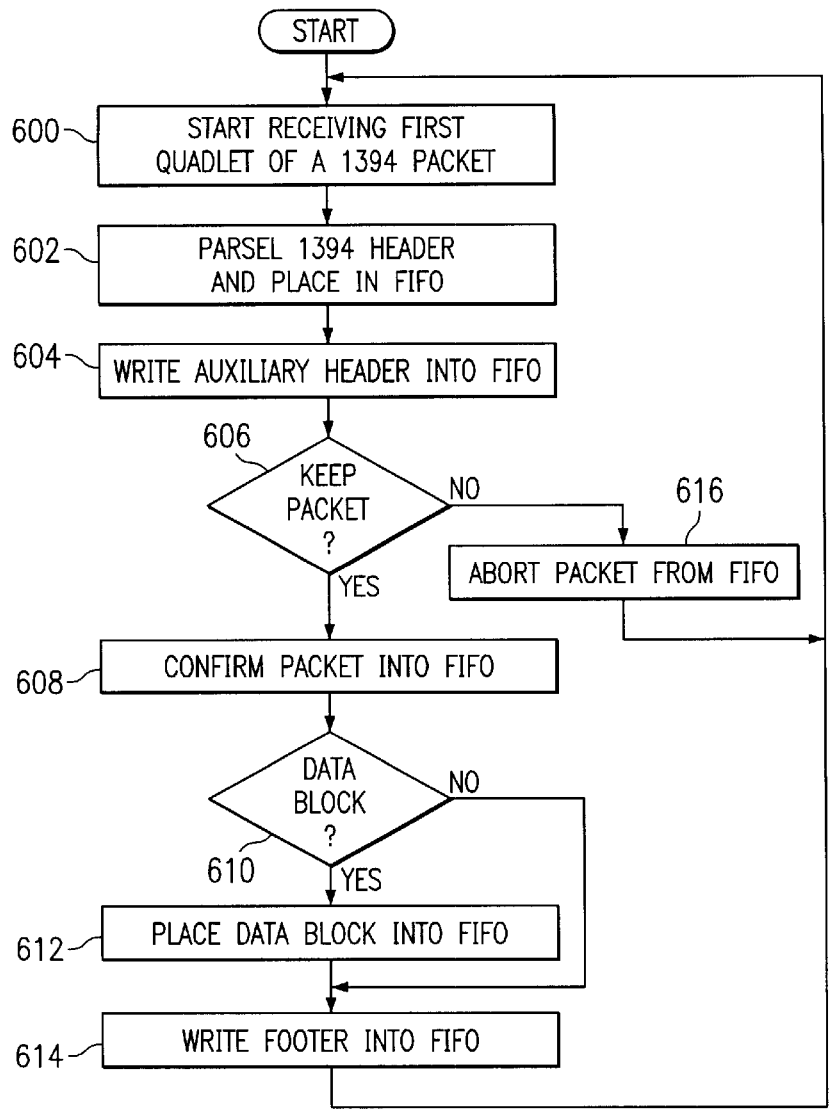
FIG. 6 is a flowchart of a process used in processing a received 1394 packet in accordance with a preferred embodiment of the present invention.

Turning now to FIG. 6, a flowchart of a process used in processing a received 1394 packet is depicted in accordance with a preferred embodiment of the present invention. This process may be incorporated within a link, such as link 308 in FIG. 3. The process begins by the link receiving a physical device packet or a 1394 packet from the physical device (step 600). Thereafter, the link parses each quadlet of the received packet and places the quadlets into the FIFO unit (step 602). The first quadlet defines the packet type so that the link knows how many quadlets are located in the header of the packet. The information parsed from the packet in step 602 is employed to create an auxiliary header and write the auxiliary header into the FIFO unit (step 604). A determination is then made as to whether to keep or accept the received packet (step 606). If the packet is to be accepted, a confirm is sent to the FIFO unit (step 608). Then, the link determines whether the packet has a data block (step 610). This determination is made using information parsed from the received packet back in step 602. If the packet has a data block, the link places the data block into the FIFO unit (step 612). Thereafter, the footer is written into the FIFO unit (step 614) with the process returning to step 600 to receive another packet from the physical device.

With reference again to step 610, if the received packet does not have a data block, the process proceeds to step 614 to write the footer into the FIFO unit. Referring back to step 606, if a decision is made not to accept the received packet, the packet is aborted from the FIFO unit (step 616) with the process returning to step 600 to wait for the next packet for processing.

Figure 7A:
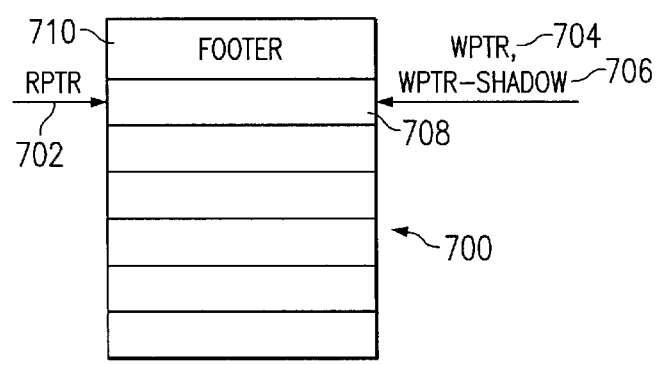
FIGS. 7A–7G are diagrams of a part of a FIFO unit and pointers in the FIFO unit during processing of a packet in accordance with a preferred embodiment of the present invention.
Figure 7B:
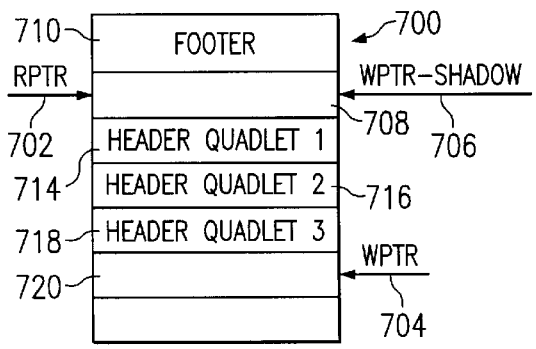
Figure 7C:
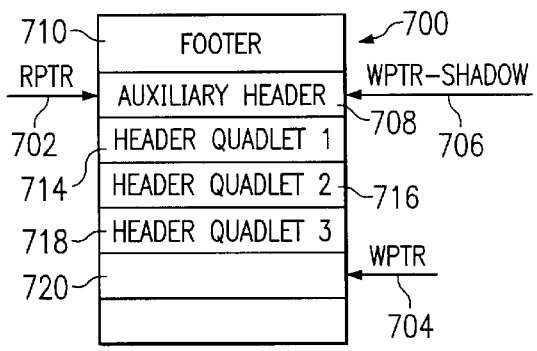
Figure 7D:
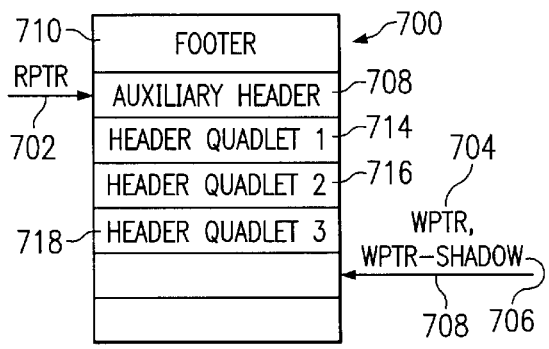
Figure 7E:
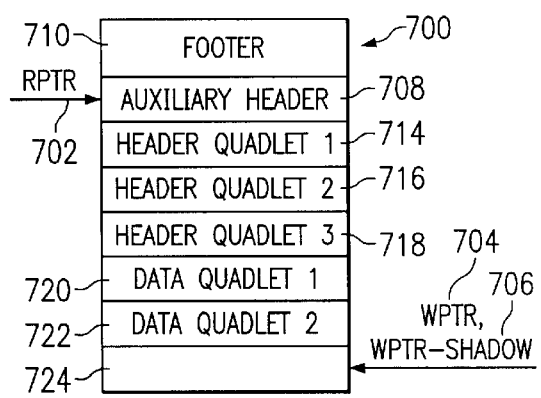
Figure 7F:
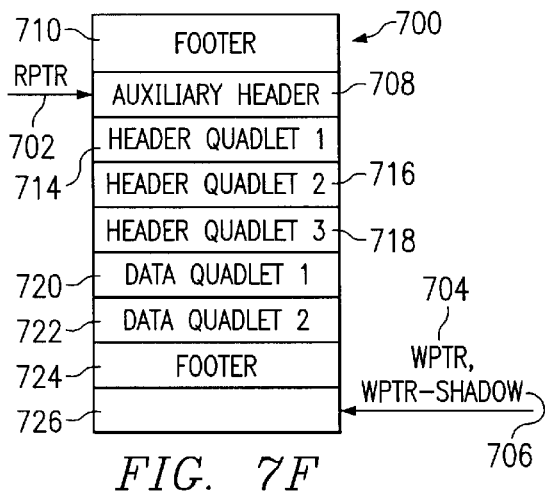
Figure 7G:
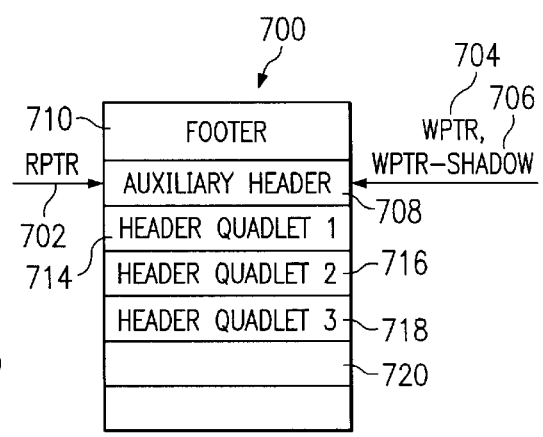

Turning now to FIGS. 7A–7G, diagrams of a part of a FIFO unit and pointers in the FIFO unit during processing of a packet in FIG. 6 are illustrated in accordance with a preferred embodiment of the present invention. In FIG. 7A, FIFO unit 700 includes a read pointer (rptr) 702, a write pointer (wptr) 704, and a write shadow pointer (wptr_shadow) 706, which is pointing to a section 708 of FIFO unit 700 below footer 710 of the previous packet placed in FIFO unit 700. Write pointer 704 and write shadow pointer 706 are equal to each other in FIG. 7A. Write shadow pointer 706 is employed to remember where the packet is started in FIFO unit 700 to allow for the packet to be aborted. In addition, shadow pointer 706 also marks where the auxiliary header will be placed in FIFI unit 700. In FIG. 7B, a 1394 header has been placed into FIFO unit 700 in sections 714–718 of FIFO unit 700. Write pointer 704 has been advanced to section 720 in FIFO unit 700. Next, the auxiliary header is placed into section 708 in FIG. 7C. The placement of the auxiliary header into section 708 is accomplished using location pointed to by write shadow pointer 706. In FIG. 7D, the header information is confirmed or accepted by setting shadow write pointer 706 equal to write pointer 704. If a data block is present in the packet being processed, the data block is placed into FIFO unit 700 as illustrated in FIG. 7E. In the depicted example, the data block is placed into sections 720 and 722 in FIFO unit 700 with write pointer 704 and shadow write pointer 706 being incremented to section 724. Next in FIG. 7F, a footer has been added to the packet in section 724 with write pointer 704 and shadow write pointer 706 being incremented to section 726.

If in FIG. 7C, a decision is made to abort or discard the packet, write pointer 704 is set equal to shadow write pointer 706 back in section 708. The sections containing the header information will be over written when the next packet is processed.

The link sends a number of signals to the receive FIFO unit in accordance with a preferred embodiment of the present invention. In particular, a write signal (Write) is used to indicate that data is to be written into the receive FIFO unit. This signal also increments the write pointer, but not the write shadow pointer (write_shadow_pointer). The confirm signal (Confirm) is used to indicate that the data placed into the receive FIFO unit should be saved. This signal increments the write shadow pointer such that it is equal to the write pointer. Typically, this confrm signal is pulsed after the header data is written into the receive FIFO unit, and then every time the data block and footer is written into the receive FIFO unit. The abort signal (Abort) is employed to indicate that the data placed into the receive FIFO unit since the last confirm signal should be removed by setting the write pointer equal to the shadow pointer. The write auxiliary header signal (WrAuxHdr) is used to indicate that data is to be written into the location saved for the auxiliary header marked by the write shadow pointer. In addition, the write signal also must be valid. The data signal (Data) is employed to provide the data to be written into the receive FIFO unit.

It is important to note that while the present invention has been described in the context of a fully functioning data processing system, those of ordinary skill in the art will appreciate that the processes of the present invention are capable of being distributed in a form of a computer readble medium of instructions and a variety of forms and that the present invention applies equally regardless of the particular type of signal bearing media actually used to carry out the distnbution. Examples of computer readable media include: recordable-type media such a floppy discs and CD-ROMs and transmission-type media such as digital and analog communications links.

The description of the preferred embodiment of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to undersand the invention for various embodinents with various modifications as are suited to the particular use contemplated.

What is claimed is:

1. A method in a node for receiving packets from a bus, the method comprising:

receiving a packet at an interface to the bus;

parsing the packet;

determining whether to retain the packet from the parsing of the packet;

placing the packet in a buffer with a header comprising an auxiliary header, which includes information derived from parsing the packet, wherein the auxiliary header is placed in front of the packet in the buffer; and moving the packet from the buffer to another bus using information located within the header, wherein repeated parsing of the packet to move the packet to another bus is unecessary.

2. The method of claim 1, wherein the first bus is a serial bus.

3. The method of claim 2, wherein the serial bus is a 1394 bus.

4. The method of claim 1, wherein the another bus is a peripheral component interconnect bus.

5. The method of claim 1, wherein the header is an auxiliary header that is placed in front of the packet in the buffer.

6. The method of claim 5, wherein the auxiliary header includes information derived from parsing the packet.

7. A method in a node for receiving packets from a bus, the method comprising:

receiving a packet at an interface to the bus;

parsing the packet;

determining whether to retain the packet from the parsing of the packet; and placing the packet in a buffer with a header comprising an auxiliary header, which includes information derived from parsing the packet, wherein the auxiliary header is placed in front of the packet in the buffer;

moving the packet from the buffer to another bus using information located within the header, wherein repeated parsing of the packet to move the packet to another bus is unnecessary; and placing a footer at an end of the packet, wherein the footer includes information about a speed at which the packet was received and an acknowledgment sent back to a source of the packet.

8. The method of claim 1, wherein the footer includes information about a speed at which the packet was received and an acknowledgment sent back to a source of the packet.

9. A method in a data processing system for processing a packet, the method comprising:

receiving a packet, wherein the packet includes a packet header;

parsing the packet header and placing the packet header in a buffer determining whether to retain the packet in response to parsing the packet header;

writing an auxiliary header into the buffer in response to a determination to retain the packet, wherein the auxiliary header includes information used to transfer the packet without a requirement to parse the packet header a second time;

placing data from the packet into the buffer in response to a determination that the packet is to be retained.

10. The method of claim 9 further comprising:

aborting the packet from the buffer in response to an absence of a determination that the packet is to be retained.

11. The method of claim 9 further comprising:

placing a footer in the buffer after placing data from the packet into the buffer.

12. A method for processing a packet comprising:

setting a first write pointer and a second write pointer to a first address in a buffer, wherein the second pointer is used to identify a start of the packet in the buffer receiving a packet for processing, wherein the packet includes a packet header;

incrementing the first write pointer to a second address;

parsing the packet header and placing the packet header into the buffer beginning at the second address pointed to by the first write pointer;

incrementing the first write pointer to a third address in response to placing the packet header into the buffer;

creating an auxiliary header;

placing the auxiliary header into the buffer begining at the first address pointed to by the second write pointer;

determining whether to accept the packet;

confirming acceptance of the packet by incrementing the second write pointer to the third address.

13. The method of claim 12 further comprising:

moving the first write pointer to the first address in response to an absence of a determination to retain the packet.

14. The method of claim 12, wherein the packet header comprises a quadlet.

15. The method of claim 12, wherein the packet header comprises four quadlets.

16. An apparatus comprising:
 a physical layer device, wherein the physical layer device has an input that is configured to receive a packet from a first bus;
 a link having a first connection to the physical layer device, wherein the link receives a packet from the physical layer device, parses a packet, and determines whether to retain the packet;
 a direct memory access engine;
 a host interface having a first connection to the direct memory access engine and a connection to a second bus;
 a buffer having a connection to the link and a connection to a direct memory access engine,
 wherein link places a packet in the buffer and adds a header to the packet in which the header contains information allowing the direct memory access engine to transfer the packet without parsing the packet.

17. The apparatus of 16, wherein the buffer is a FIFO buffer.

18. The apparatus of claim 16, wherein the first bus is a serial bus.

19. The apparatus of claim 18, wherein the serial bus is a 1394 bus.

20. The apparatus of claim 16, wherein the second bus is a peripheral component interconnect bus.

21. A node for receiving packets from a bus, the method comprising:
 reception means for receiving a packet at an interface to the bus;
 parsing means for parsing the packet;
 determining means for determining whether to retain the packet from the parsing of the packet;
 placing means for placing the packet in a buffer with a header comprising an auxiliary header which includes information derived from parsing the packet, wherein the auxiliary header is placed in front of the packet in the buffer; and
 moving means for moving the packet from the buffer to another bus using information located within the header, wherein repeated parsing of the packet to move the packet to another bus is unnecessary.

22. The node of claim 21, wherein the bus is a serial bus.

23. The node of claim 22, wherein the serial bus is a 1394 bus.

24. The node of claim 21, wherein the another bus is a peripheral component interconnect bus.

25. The node of claim 21, wherein the header is an auxiliary header that is placed in front of the packet in the buffer.

26. The node of claim 25, wherein the auxiliary header includes information derived from parsing the packet.

27. A node for receiving packets from a bus, the method comprising:
 reception means for receiving a packet at an interface to the bus;
 parsing means for parsing the packet;
 determining means for determining whether to retain the packet from the parsing of the packet;
 placing means for placing the packet in a buffer with a header comprising an auxiliary header which includes information derived from parsing the packet, wherein the auxiliary header is placed in front of the packet in the buffer; and
 moving means for moving the packet from the buffer to another bus using information located within the header, wherein repeated parsing of the packet to move the packet to another bus is unnecessary; and
 placing a footer at an end of the packet, wherein the footer includes information about a speed at which the packet was received and an acknowledgment sent back to a source of the packet.

28. The node of claim 21, wherein the footer includes information about a speed at which the packet was received and an acknowledgment sent back to a source of the packet.

29. A data processing system for processing a packet, the data processing system comprising:
 reception means for receiving a packet, wherein the packet includes a packet header;
 parsing means for parsing the packet header and placing the packet header in a buffer
 determination means for determining whether to retain the packet in response to parsing the packet header;
 first writing means for writing an auxiliary header into the buffer, wherein the auxiliary header includes information used to transfer the packet without a requirement to parse the packet header a second time;
 second writing means for writing data from the packet into the buffer in response to a determination that the packet is to be retained.

30. The data processing system of claim 29 further comprising:
 aborting means for aborting the packet from the buffer in response to an absence of a determination that the packet is to be retained.

31. The data processing system of claim 29 further comprising:
 appending a footer to the packet.

32. An apparatus for processing a packet comprising:
 setting means for setting a first write pointer and a second write pointer to a first address in a buffer, wherein the second pointer is used to identify a start of the packet in the buffer
 reception means for receiving a packet for processing, wherein the packet includes a packet header;
 first incrementing means for incrementing the first write pointer to a second address;
 parsing means for parsing the packet header and placing the packet header into the buffer beginning at the second address pointed to by the first write pointer;
 second incrementing means for incrementing the first write pointer to a third address in response to placing the packet header into the buffer;
 creating means for creating an auxiliary header;
 placing means for placing the auxiliary header into the buffer beginning at the first address pointed to by the second write pointer;
 determining means for determining whether to accept the packet;
 confirming means for confirming acceptance of the packet by incrementing the second write pointer to the third address.

33. The apparatus of claim 32 further comprising:
 moving means for moving the first write pointer to the first address in response to an absence of a determination to retain the packet.

34. The method of claim 32, wherein the packet header comprises a quadlet.

35. The method of claim 32, wherein the packet header comprises four quadlets.

36. An apparatus for processing a packet a buffer;

a link layer linking a higher level with a lower level having a plurality of modes of operation including:

a first mode of operation in which the link layer receives a packet from a bus, wherein the packet includes a packet header;

a second mode of operation, responsive to the link layer receiving the packet, in which the link parses the packet;

a third mode of operation, responsive to parsing the packet, in which the link layer creates an auxiliary header and places the packet header into the buffer;

a fourth mode of operation, responsive to parsing the packet header, in which the link layer determines whether to retain the packet;

a fifth mode of operation, responsive to a determination by the link layer to retain the packet, data portions of the packet are placed into the buffer.

37. A method in a node for receiving packets from a bus, the method comprising:

receiving a packet at an interface to the bus;

parsing a first header of the packet;

determining whether to retain the packet from the parsing of the first header;

generating a second header associated with the packet;

placing the packet in a buffer along with the second header; and moving the packet from the buffer to another bus using information located within the second header without parsing the first header again.

38. The method of claim 37, wherein the second header includes information derived from parsing the packet.

39. The method of claim 37, wherein the first header is the original header of the packet coming from the bus.

40. The method of claim 37, wherein the second header is an auxiliary header.

41. A node for receiving packets from a bus, the method comprising:

reception means for receiving a packet at an interface to the bus;

parsing means for parsing a first header of the packet;

determining means for determining whether to retain the packet from the parsing of the first header;

generating means for generating a second header associated with the packet;

placing means for placing the packet in a buffer with the second header; and moving means for moving the packet from the buffer to another bus using information located within the second header without parsing the first header again.

42. The node of claim 41, wherein the first header is the original header of the packet coming from the bus.

43. The node of claim 41, wherein the second header is an auxiliary header.

* * * * *